United States Patent [19]

Ema et al.

[11] Patent Number: 4,544,727
[45] Date of Patent: Oct. 1, 1985

[54] COPOLYMERS OF ACRYLONITRILE, STYRENE, AND PARA-ISOPROPENYLPHENOL

[75] Inventors: Kenji Ema, Yokohama; Jun Saito, Kamakura; Takatoshi Mitsuishi, Isehara; Shuhei Ikado, Yokohama, all of Japan

[73] Assignee: Wakabayashi Patent Agency, Tokyo, Japan

[21] Appl. No.: 635,496

[22] Filed: Jul. 30, 1984

Related U.S. Application Data

[63] Continuation of Ser. No. 448,857, filed as PCT JP 82/00129, Apr. 19, 1982, § 102(e) date Dec. 10, 1982, abandoned.

[30] Foreign Application Priority Data

Apr. 21, 1981 [JP] Japan .................. 56-59189

[51] Int. Cl.[4] .................. C08F 216/02; C08F 212/24; C08F 212/10
[52] U.S. Cl. .................................... 526/313; 526/342
[58] Field of Search .................. 526/313, 342

[56] References Cited

U.S. PATENT DOCUMENTS 4,182,803  1/1980  Kanagawa et al. .................. 526/313

FOREIGN PATENT DOCUMENTS 4816061  5/1973  Japan .
526791  11/1979  Japan .
8300153  1/1983  PCT Int'l appl. .................. 526/313

*Primary Examiner*—Joseph L. Schofer
*Assistant Examiner*—Peter F. Kulkosky
*Attorney, Agent, or Firm*—Fisher, Christen & Sabol

[57] ABSTRACT

A copolymer consisting of 30 to 65 mole % of structural units of the formula

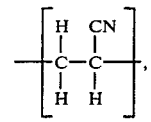
(I)

1 to 55 mole % of structural units of the formula

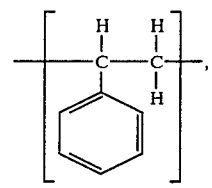
(II)

and 10 to 60 mole % of structural units of the formula

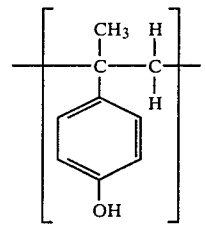

and having a number average molecular weight of 500 to 200,000.

5 Claims, 5 Drawing Figures

COPOLYMERS OF ACRYLONITRILE, STYRENE, AND PARA-ISOPROPENYLPHENOL

This is a continuation application of Ser. No. 448,857, filed as PCT JP82/00129, Apr. 19, 1982, § 102(e) date on Dec. 10, 1982, now abandoned.

TECHNICAL FIELD

This invention relates to novel copolymers. More particularly, it relates to novel copolymers obtained by copolymerization of acrylonitrile, styrene, and paraisopropenylphenol.

BACKGROUND ART

Conventionally, acrylonitrile-styrene type copolymers (hereinafter referred to as AS type resins) are well known and has been commonly used in such applications as molding materials and the like. Specific examples thereof are acrylonitrile-styrene copolymers (hereinafter referred to as AS resins), acrylonitrile-butadiene-styrene resins (hereinafter referred to as ABS resins), and the like.

Where AS resins are used as molding materials, they are subjected to finish coating in order to impart an attractive appearance to the molded articles and maintain their properties such as weather resistance and the like. This finish coating is generally performed by using an acrylic paint. However, AS resin moldings coated with an acrylic paint involve several problems, for example, in that a peeling-off of the acrylic paint from the AS resin may frequently occur during use and thereby impair their commercial value.

As for para-isopropenylphenol, copolymers of it and acrylonitrile or styrene have been investigated respectively. However, the performance characteristics of these copolymers are not thoroughly known. According to the findings of the present inventors, it has been determined that, when added to AS resins, the former copolymer exhibits poor miscibility therewith and can hardly produce any desired improvement in adhesion properties. The latter copolymer involves no problem concerning miscibility with AS resins, but have no appreciable effect in improving adhesion properties.

In order to overcome the above-described disadvantages of AS resins, the present inventors have made intensive and extensive studies and have found that certain copolymers obtained by copolymerization of acrylonitrile, styrene, and para-isopropenylphenol have excellent heat resistance and adhesion properties and, when used as modifying agents for AS resins, can improve the adhesion between the AS resin moldings and the acrylic paint.

DISCLOSURE OF THE INVENTION

According to the present invention, there is provided a copolymer obtained by copolymerization of acrylonitrile, styrene, and para-isopropenylphenol which monomer has never been used in prior art AS type resins. This AS type copolymer has hydroxyl groups introduced thereinto by the para-isopropenylphenol.

Therefore, the copolymer of the present invention not only has excellent impact resistance and chemical resistance just like common AS type resins, but also shows a particularly distinct improvement in heat resistance, adhesion properties and the like.

The copolymer of the present invention, as such, can be effectively utilized as a molding resin. Moreover, the present copolymer has phenolic hydroxyl groups, though it is an AS type resin. Accordingly, when incorporated in conventional AS type resins, the present copolymer can improve their paintability (in particular, adhesion of the paint) and heat resistance and hence has great usefulness as a modifying agent for AS type resins.

Furthermore, since the copolymer of the present invention has phenolic hydroxyl groups in spite of its thermoplasticity, it can be effectively utilized by combining it with various thermosetting resins such as phenolic resins, melamine resins, guanamine resins, urea resins, ketone resins, epoxy resins, polyurethane resins, toluene resins, xylene resins, alkyd resins, aminoalkyd resins, and the like.

BEST MODE FOR CARRYING OUT THE INVENTION

Figure 1:
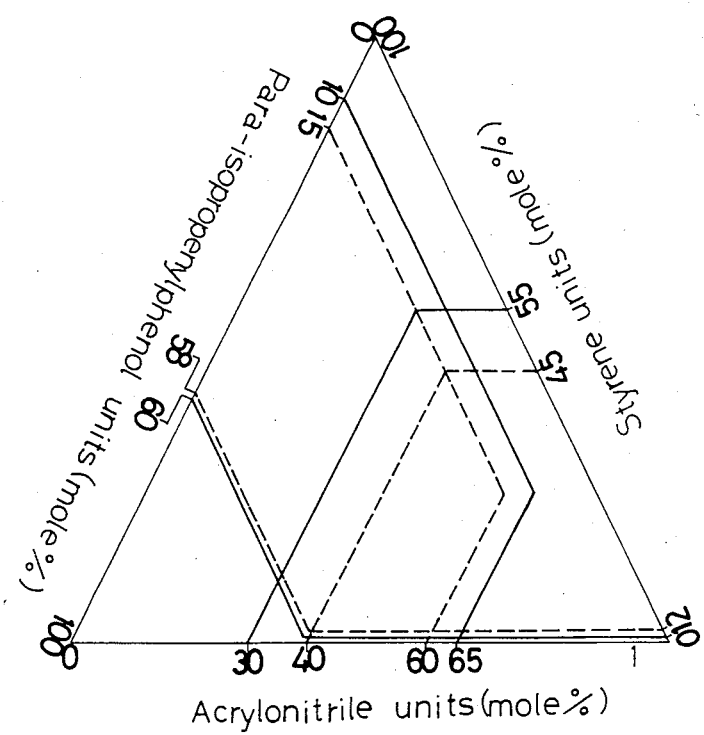
FIG. 1 is a diagram showing the preferred and most preferred ranges of the ratio of monomeric components constituting the copolymer of the present invention.

The copolymer of the present invention consists of 30 to 65 mole % of structural units of the formula

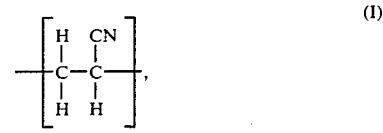

1 to 55 mole % of structural units of the formula

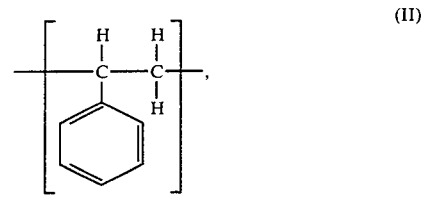

and 10 to 60 mole % of structural units of the formula

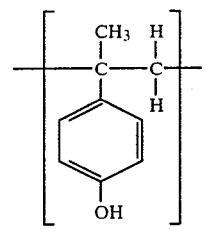

and having a number average molecular weight of 500 to 200,000.

The copolymer of the present invention can be prepared by radical polymerization. As for the polymerization method, any of the conventionally known means is applicable to the present invention. Specifically, the means and techniques which can be used in the practice of the present invention include, for example, solution polymerization, bulk polymerization, suspension polymerization, emulsion polymerization, and the like, as well as batch polymerization, continuous polymerization, and the like.

In the radical polymerization for preparing the copolymer of the present invention, azo initiators, peroxide initiators, redox initiators consisting of a combination of peroxide and reducing agent, and the like can be used as polymerization initiators.

Specific examples of such initiators include azobisisobutyronitrile, azobis-2,4-Dimethylvaleronitrile, azobiscyclohexanecarbonitrile, azobis-2-amidinopropane hydrochloride, and the like (azo initiators); benzoyl peroxide, lauroyl peroxide, acetyl peroxide, cumene hydroperoxide, tert-butyl hydroperoxide, di-tert-butyl hydroperoxide, and the like (peroxide initiators); and benzoyl peroxide-N,N-dimethylaniline, peroxodisulfuric acid-sodium hydrogen sulfite, and the like (redox initiators).

In preparing the copolymer of the present invention the three monomeric components should be used in such a proportion that the amount of acrylonitrile is in the range of 30 to 65 mole % and preferably 40 to 60 mole %, the amount of styrene is in the range of 1 to 55 mole % and preferably 2 to 45 mole %, and the amount of para-isopropenylphenol is in the range of 10 to 60 mole % and preferably 15 to 58 mole %, the total amount of the three monomeric components being 100 mole %.

In preferred embodiments of the present invention, solution polymerization, emulsion polymerization, suspension polymerization, and the like are generally used because they permit removal of the heat of reaction, control of the reaction, and the like. However, provided that these conditions are satisfied, the use of bulk polymerization and the like is not precluded especially when the polymerization is carried out in a continuous manner.

The monomers may be fed in bulk, in portions, or in a continuous manner. The order of feeding of the three monomers should usually be such that they are fed in parallel with each other, with or without previous admixture. During the period of time extending from the beginning to the end of the feeding, the proportion of the three monomers may be kept constant or changed as desired.

The copolymers prepared in accordance with the present invention may be in the form of random copolymers, block copolymers, graft copolymers, and the like, as well as mixtures of the foregoing. However, they are mostly random copolymers owing to their method of preparation.

As for the composition of the copolymer of the present invention, its molecular weight can be determined by gel permeation chromatography, its molecular structure can be established on the basis of its IR spectrum, and the ratio of acrylonitrile units, styrene units, and para-isopropenylphenol units present therein can be estimated from its NMR spectrum. Morevoer, the copolymer can also be identified by its glass transition temperature.

In order to achieve excellent adhesion properties, heat resistance, and the like, the copolymer of the present invention should have a number average molecular weight of 500 to 200,000, preferably 500 to 50,000, and most preferably 1,000 to 10,000.

In addition, the amounts of three types of structural units (i.e., acrylonitrile units, styrene units, and para-isopropenylphenol units) constituting the copolymer of the present invention should be such that, when expressed in mole %, the acrylonitrile:styrene:para-isopropenylphenol ratio is preferably in the range of 30–65:1-55:-10–60 and most preferably in the range of 40-60:2-45:-15–58.

The above-described preferred and most preferred ranges of the ratio of monomeric components constituting the copolymer of the present invention are illustrated in the triangular diagram of FIG. 1. Specifically, the preferred range is represented by the hexagonal region surrounded by lines corresponding to 30 and 65 mole % of acrylonitrile units, lines corresponding to 1 and 55 mole % of styrene units, and lines corresponding to 10 and 60 mole % of para-isopropenylphenol units, and the most preferred range is represented by the trapezoidal region surrounded by lines corresponding to 40 and 60 mole % of acrylonitrile units, lines corresponding to 2 and 45 mole % of styrene units, and lines corresponding to 15 and 58 mole % of para-isopropenylphenol units.

The present invention is further illustrated by the following examples and application test. It is to be understood that these examples and application test are merely illustrative, and not limitative, of the present invention.

Unless otherwise stated, parts, percentages, and proportions are by weight.

EXAMPLE 1

Figure 2:
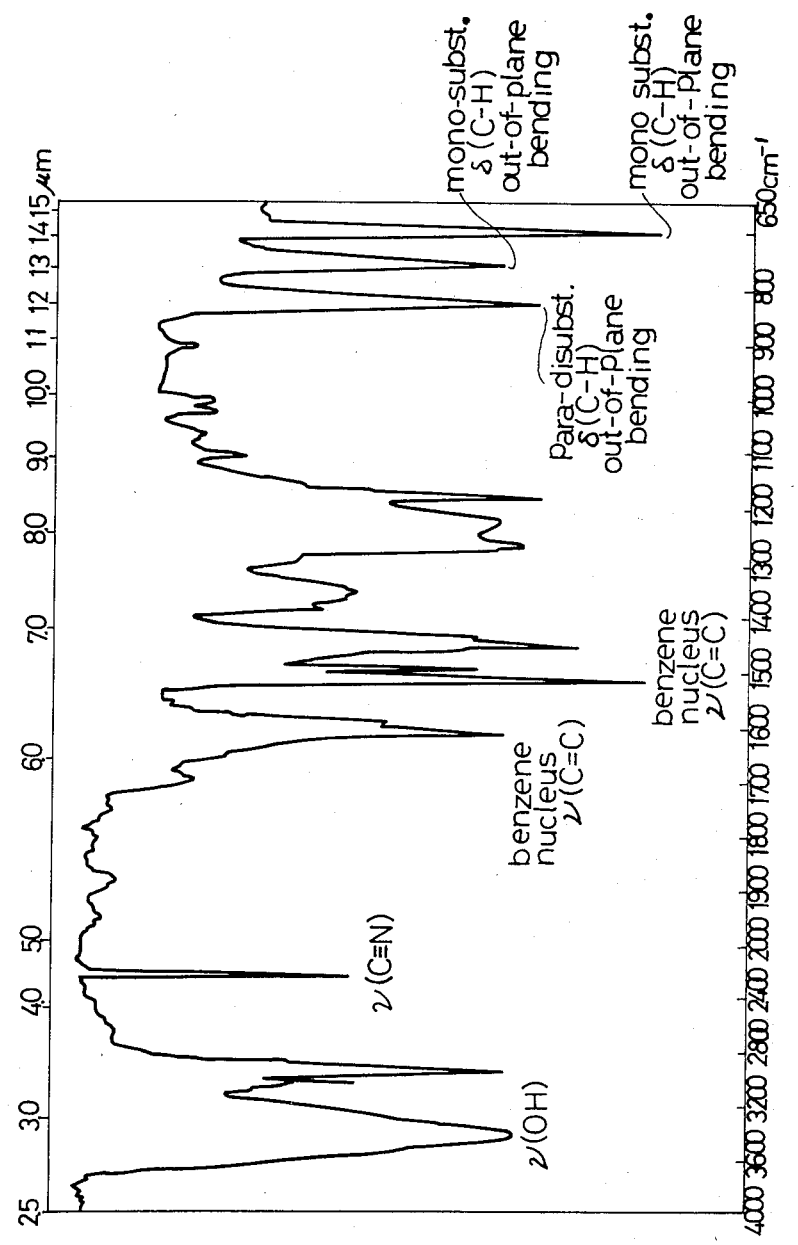
FIG. 2 shows an IR spectrum of the copolymer of Example 1.

In a reactor fitted with a stirrer and a condenser, 233 parts of methyl isobutyl ketone (hereinafter referred to as MIBK) was placed and heated, with stirring, to its boiling point. While it was being refluxed, a mixture consisting of 33 parts of acrylonitrile (hereinafter referred to as AN), 37 parts of styrene (hereinafter referred to as St), 30 parts of para-isopropenylphenol (hereinafter referred to as PIPE), and 4.8 parts of azobisisobutyronitrile (hereinafter referred to as AIBN) was added dropwise thereto over a period of 3 hours to polymerize these monomers. Thereafter, the internal temperature was lowered to 100° C. and 0.5 part of AIBN was added. Then, the reaction mixture was stirred at 100° C. for an additional 2 hours to further polymerize the remaining monomers and thereby to give a copolymer solution having a solid content of 30%. This copolymer solution was dried in vacuo at 170° C. for 4 hours to obtain 92 parts of a powdered copolymer (A) exemplifying the copolymer of the present invention. Gel permeation chromatography (hereinafter referred to as GPC) and thermomechanical analysis (hereinafter referred to as TMA) revealed that this copolymer had a number average molecular weight of 5,500 and a glass transition temperature of 103° C., respectively. Moreover, infrared (IR) absorption analysis of the copolymer gave an IR spectrum (as shown in FIG. 2), in which the following absorption characteristics were recognized.

Specifically, an absorption band due to $\gamma(OH)$ was noted at 3420 cm$^{-1}$; an absorption band due to $\gamma(C\equiv N)$, at 2240 cm$^{-1}$; absorption bands due to benzene nucleus $\gamma(C=C)$, at 1615 and 1520 cm$^{-1}$; an absorption band due to para-disubstituted $\delta(C-H)$ out-of-plane bending, at 834 cm$^{-1}$; and absorption bands due to monosubstituted $\delta(C-H)$ out-of-plane bending, at 762 and 702 cm$^{-1}$.

Figure 3:
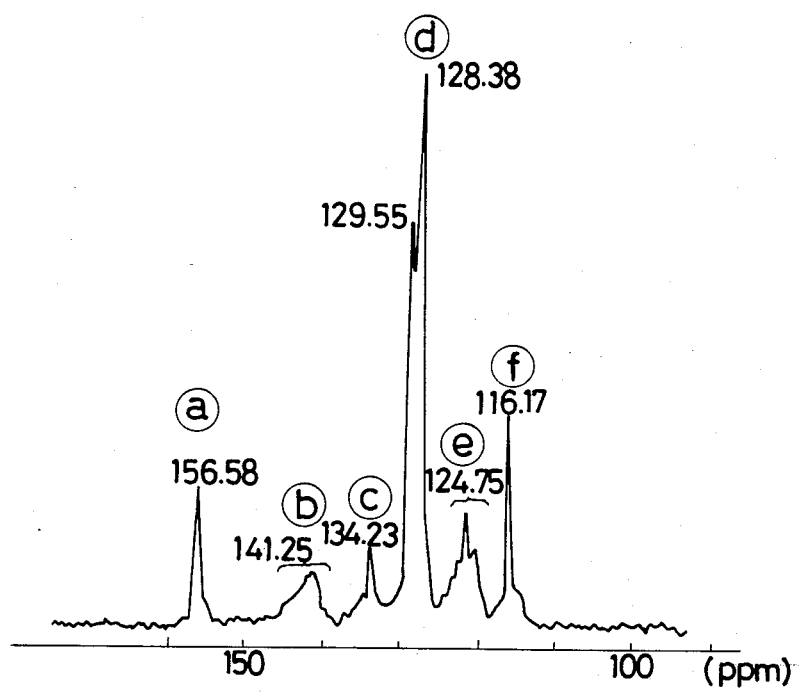
FIG. 3 shows a $^{13}$C-NMR spectrum of the copolymer of Example 1.

In addition, a $^{13}C$-nuclear magnetic resonance spectrum (hereinafter referred to as $^{13}C$-NMR spectrum) of the copolymer was recorded by using deuterated acetone as the solvent and tetramethylsilane as the reference compound (which conditions also apply to the succeeding examples), the 100-170 ppm region of the spectrum being shown in FIG. 3. The various signals noted in this region of the spectrum can be assigned as follows: Signal (a) is assignable to the carbon atom in the 4-position of the aromatic ring of PIPE units; signal (b), to the carbon atom in the 1-position of the aromatic ring of St units; signal (c), to the carbon atom in the 1-position of the aromatic ring of PIPE units; signal (d), to the carbon atoms in the 2- and 6-positions of PIPE units and in the 2-, 3-, 4-, 5-, and 6-positions of St units; signal (e), to the nitrile carbon atom of AN units; and signal (f), to the carbon atoms in the 3- and 5-positions of PIPE units. The molar ratio of AN, St, and PIPE units as estimated from the signal intensity ratios was 47:34:19.

On the basis of the above-described results, the product was determined to be a copolymer of acrylonitrile, styrene, and para-isopropenylphenol.

EXAMPLE 2

Figure 4:
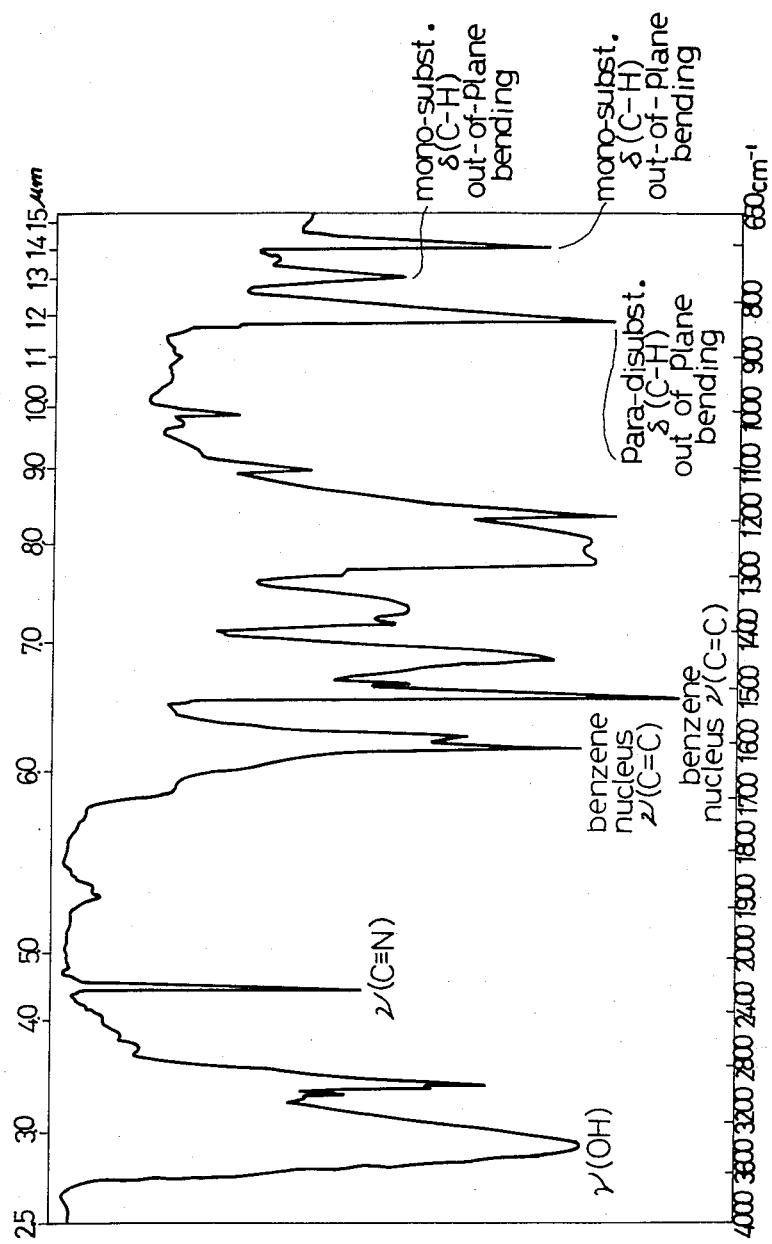
FIGS. 4 and 5 show IR and $^{13}$C-NMR spectra, respectively, of the copolymer of Example 2.
Figure 5:
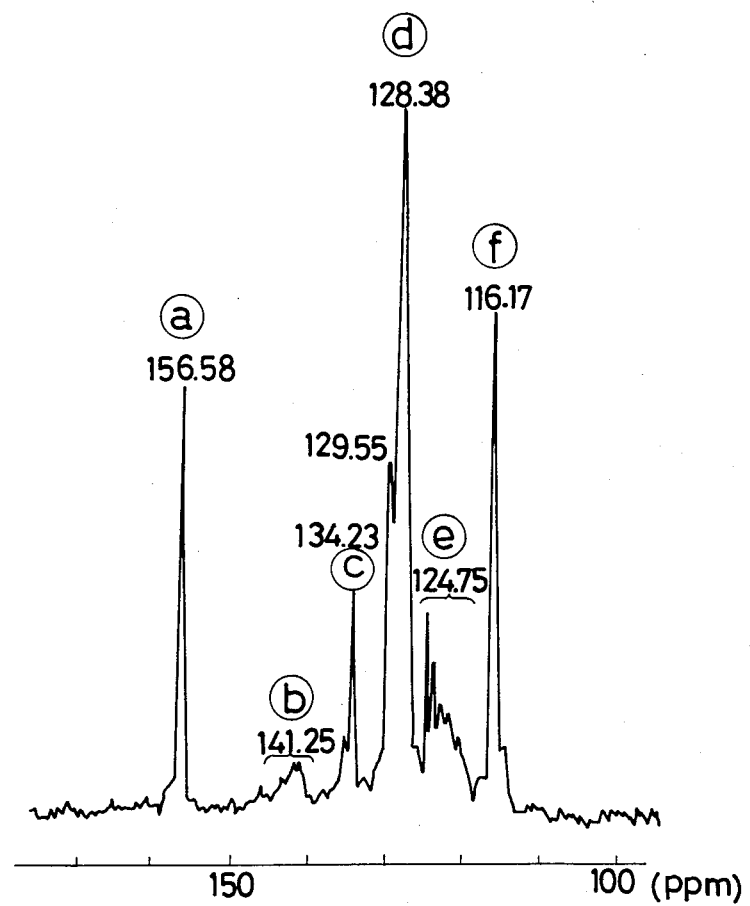

A copolymer solution having a solid content of 29.5% was prepared by repeating the procedure of Example 1 except that 32 parts of AN, 18 parts of St, and 50 parts of PIPE were used. Thereafter, this copolymer solution was worked up in the same manner as in Example 1 to obtain 90 part of a powdered copolymer (B) also exemplifying the copolymer of the present invention. GPC and TMA revealed that this copolymer had a number average molecular weight of 4,900 and a glass transition temperature of 115° C., respectively. Moreover, its IR spectrum exhibited the same aborption characteristics as noted in Example 1. In addition, its $^{13}$C-NMR spectrum as recorded under the conditions of Example 1 exhibited the same signals as noted in Example 1. Furthermore, it was recognized that the increased proportion of PIPE over Example 1 was reflected in an increase in the areas under signals (a), (c), and (f). The IR and $^{13}$C-NMR spectra of the copolymer are shown in FIGS. 4 and 5, respectively. On the basis of the above-described results, the product was determined to be a copolymer of acrylonitrile, styrene, and para-isopropenyl phenol. The molar ratio of AN, St, and PIPE units as estimated from the signal intensity ratios was 50:19:31.

EXAMPLE 3

The procedure of Example 1 was repeated except that the various starting materials, conditions, and measuring methods indicated in Table 1 were used. Thus, there were obtained a number of powdered copolymers (C) to (G) as indicated in Table 1.

TABLE 1

| Powdered copolymer | (C) | (D) | (E) | (F) | (G)*[1] |
|---|---|---|---|---|---|
| (1) Monomers AN (parts) | 30 | 30 | 35 | 40 | |
| St (parts) | 5 | 50 | 40 | | 64 |
| PIPE (parts) | 65 | 20 | 25 | 60 | 36 |
| (2) AIBN as initiator (parts) | 4.8 | 3.0 | 3.0 | 4.8 | 1.0 |
| (3) Method of feeding (1) and (2) | | Added dropwise during polymerization | | Added dropwise during polymerization | Initially fed in bulk |
| (4) Polymerization temperature | | Reflux temperature | | Reflux temperature | 60° C. |
| (5) Polymerization time | | 3 hours | | 3 hours | 20 hours |
| (6) AIBN for postpolymerization (parts) | | 0.5 | | 0.5 | Not done |
| (7) Postpolymerization temperature | | 100° C. | | 100° C. | Not done |
| (8) Postpolymerization time | | 2 hours | | 2 hours | Not done |
| Number average molecular weight | 5200 | 6500 | 4000 | 4500 | 9000 |
| AN/ST/PIPE (molar ratio)*[2] | 48/4/48 | 42/42/16 | 51/31/18 | 53/0/47 | 0/68/32 |
| Remarks | | Examples of the present invention | | Comparative examples | |

[Notes]
*[1] Prepared by bulk polymerization.
*[2] Monomer units present in copolymer.

APPLICATION TEST

The effects of the various copolymers obtained in the foregoing examples were tested with molded pieces made by adding these copolymers to a commercially available AS type resin (LITAC A-100; manufactured and sold by Mitsui Toatsu Chemicals Co., Ltd.).

Specifically, the aforesaid AS type resin was roll-milled at 150° C. for 5 minutes, with 1, 5, or 10% of copolymer (A), with 5% of copolymer (B), (C), (D), (E), (F), or (G), or without any copolymer. The uniformity of the milled product was judged from its appearance. Then, the resulting milled products were pelletized to obtain a series of pellets (i) to (x). Using an injection molding machine, 150×70×3 mm molded pieces and tensile specimens (ASTM No. 1 dumbbells) were made of these pellets.

A major surface (150×70 mm) of each molded piece was coated with a commercially available acrylic paint (R-110; manufactured and sold by Nihon Paint Co., Ltd.) to a thickness corresponding to a dry film thickness of 15μ, dried by allowing it to stand for one day, and then subjected to a cross-cut adhesion test according to JIS K5400.

Each tensile specimen was allowed to stand in an over at 100° C. for a predetermined period of time, and then tested for tensile strength according to ASTM D-638.

The test results thus obtained are given in Table 2.

TABLE 2

| Pellet designation | (i) | (ii) | (iii) | (iv) | (v) | (vi) | (vii) | (viii) | (ix) | (x) |
|---|---|---|---|---|---|---|---|---|---|---|
| Added copolymer | | | | | | | | | | |
| Type | (A) | (A) | (A) | (B) | (C) | (D) | (E) | (F) | (G) | — |

TABLE 2-continued

| Pellet designation | (i) | (ii) | (iii) | (iv) | (v) | (vi) | (vii) | (viii) | (ix) | (x) |
|---|---|---|---|---|---|---|---|---|---|---|
| Amount (%) | 1 | 5 | 10 | 5 | 5 | 5 | 5 | 5 | 5 | — |
| Uniformity of milled product | O | O | O | O | O | O | O | X | Δ | — |
| Peeling test (degree of peeling, %) | 20 | 10 | 5 | 10 | 5 | 15 | 10 | 40 | 60 | 50 |
| Tensile strength (Kg/mm²) | | | | | | | | | | |
| Before treatment at 100° C. | 730 | 740 | 750 | 750 | 750 | 730 | 730 | 720 | 730 | 730 |
| After 1 month of treatment at 100° C. | 710 | 730 | 740 | 730 | 740 | 720 | 710 | 690 | 670 | 650 |
| After 2 months of treatment at 100° C. | 690 | 710 | 720 | 700 | 730 | 690 | 690 | 620 | 600 | 600 |
| After 3 months of treatment at 100° C. | 670 | 680 | 700 | 680 | 710 | 680 | 680 | 560 | 500 | 540 |

*¹ O = Good; Δ = Fairly Good; X = Poor.

We claim:

1. Copolymer consisting of 30 to 65 mole percent of structural units having the formula:

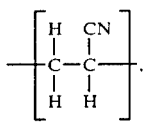

(I)

5 to 45 mole percent of structural units having the formula:

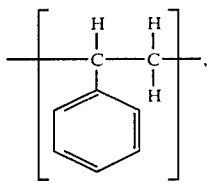

(II)

and 10 to 60 mole percent of structural units having the formula:

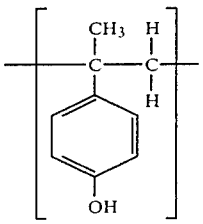

(III)

and having a number average molecular weight of 500 to 200,000.

2. The copolymer as claimed in claim 1 which consists of 40 to 60 mole percent of the structural units of formula (I), 5 to 45 mole percent of the structural units of formula (II), and 15 to 60 mole percent of the structural units of formula (III).

3. The copolymer as claimed in claim 1 which has a number average molecular weight of 500 to 50,000.

4. The copolymer as claimed in claim 7 which has a number average molecular weight of 500 to 50,000.

5. The copolymer consisting of acrylonitrile units, styrene units and para-isopropenylphenol units, the mole percent of para-isopropenylphenol being in the range of 10 to 60 percent based upon the moles of the monomeric components, the minimum mole percent of styrene and acrylonitrile being 5 percent and 30 percent, respectively, based upon the moles of the monomeric compounds, and the number average molecular weight of the copolymer being 500 to 200,000.

* * * * *